United States Patent
Piersol et al.

(10) Patent No.: US 7,731,435 B2
(45) Date of Patent: Jun. 8, 2010

(54) TECHNIQUES FOR PRINTING WITH INTEGRATED PAPER SHEET IDENTIFICATION

(75) Inventors: Kurt Piersol, Campbell, CA (US); Stephen Weyl, Los Altos, CA (US)

(73) Assignee: Ricoh Company, Ltd. (JP)

( * ) Notice: Subject to any disclaimer, the term of this patent is extended or adjusted under 35 U.S.C. 154(b) by 761 days.

(21) Appl. No.: 11/494,829

(22) Filed: Jul. 28, 2006

(65) Prior Publication Data

US 2007/0036599 A1     Feb. 15, 2007

Related U.S. Application Data (60) Provisional application No. 60/708,735, filed on Aug. 15, 2005, provisional application No. 60/707,739, filed on Aug. 12, 2005.

(51) Int. Cl.
*G06K 7/00* (2006.01)
(52) U.S. Cl. .......... 400/62; 399/366; 399/370; 400/104; 283/68; 283/69
(58) Field of Classification Search .......... 399/366, 399/370; 400/62, 104; 358/1.13, 1.14, 3.28; 283/68, 69
See application file for complete search history.

(56) References Cited

U.S. PATENT DOCUMENTS

| | | | |
|---|---|---|---|
| 6,122,394 A | | 9/2000 | Neukermans et al. |
| 6,170,744 B1 * | | 1/2001 | Lee et al. .......... 235/380 |
| 6,389,151 B1 | | 5/2002 | Carr et al. |
| 6,628,377 B1 | | 9/2003 | Sabatini et al. |
| 6,970,573 B2 | | 11/2005 | Carr et al. |
| 7,603,434 B2 | | 10/2009 | Svendsen |
| 2002/0105666 A1 | | 8/2002 | Sesek |
| 2002/0116618 A1 | | 8/2002 | Muratani |
| 2004/0196485 A1 | | 10/2004 | Hikichi et al. |
| 2005/0021474 A1 | | 1/2005 | Geist et al. |
| 2005/0283839 A1 | | 12/2005 | Cowburn |
| 2006/0020803 A1 | | 1/2006 | O'Hagan |
| 2006/0151990 A1 | | 7/2006 | Cowburn |
| 2006/0294583 A1 | | 12/2006 | Cowburn et al. |
| 2007/0025619 A1 | | 2/2007 | Cowburn et al. |

(Continued)

FOREIGN PATENT DOCUMENTS

EP     1 202 225 A2     5/2002

(Continued)

OTHER PUBLICATIONS

European Communication Pursuant to Article 94(3)EPC for European Application No. 07112623.9-2218, Dated Mar. 3, 2009.

(Continued)

*Primary Examiner*—Judy Nguyen
*Assistant Examiner*—Matthew G Marini
(74) *Attorney, Agent, or Firm*—Townsend and Townsend and Crew LLP (57) ABSTRACT

A printing method and apparatus includes fingerprinting a sheet of printable media such as paper to obtain a fingerprint. The fingerprint is encrypted using an encryption key known only to the user wanting to print the document. The encrypted fingerprint is then encoded and transferred to the document as machine readable information.

20 Claims, 6 Drawing Sheets

U.S. PATENT DOCUMENTS

| | | |
|---|---|---|
| 2007/0027819 A1 | 2/2007 | Cowburn et al. |
| 2007/0028093 A1 | 2/2007 | Cowburn et al. |
| 2007/0028107 A1 | 2/2007 | Cowburn et al. |
| 2007/0028108 A1 | 2/2007 | Cowburn et al. |
| 2007/0036470 A1 | 2/2007 | Piersol et al. |
| 2007/0053005 A1 | 3/2007 | Cowburn |
| 2007/0067248 A1 | 3/2007 | Chatte |
| 2007/0113076 A1 | 5/2007 | Cowburn et al. |
| 2007/0115497 A1 | 5/2007 | Cowburn |
| 2007/0153078 A1 | 7/2007 | Cowburn |
| 2007/0164729 A1 | 7/2007 | Cowburn et al. |
| 2007/0165208 A1 | 7/2007 | Cowburn et al. |
| 2007/0233612 A1 | 10/2007 | Barrus et al. |
| 2008/0130038 A1 | 6/2008 | Igarashi |
| 2008/0240816 A1 | 10/2008 | Piersol et al. |

FOREIGN PATENT DOCUMENTS

| | | | |
|---|---|---|---|
| EP | 1455284 A2 | | 8/2004 |
| EP | 1 591 952 A1 | | 11/2005 |
| EP | 1883053 A1 | | 1/2008 |
| GB | 2 411 954 | | 9/2005 |
| GB | 2 417 074 A | | 2/2006 |
| GB | 2 417 707 A | | 3/2006 |
| JP | 2004112644 A | * | 4/2004 |
| JP | 2008071338 A | | 8/2007 |
| WO | WO 2005/088517 | | 9/2005 |
| WO | WO 2005/088517 A1 | | 9/2005 |
| WO | WO 2005/088533 | | 9/2005 |

OTHER PUBLICATIONS

Extended European Search Report mailed Dec. 12, 2007 in European application No. 07113300.3-1228.

U.S. Appl. No. 11/694,088, filed Mar. 30, 2007, Piersol et al.

European Search Report for European Application 07112623 dated Aug. 17, 2007.

"'Fingerprinting' documents and packing—Unique surface imperfections serve as an easily identifiable feature in the fight against fraud." Brief Communications, Jul. 28, 2005, p. 475, vol. 436, Nature Publishing Group.

Extended European Search Report in European Application No. 08251203.9-1228, mailed Jun. 23, 2009.

Requirement for Restriction/Election for U.S. Appl. No. 11/495,613, mailed on Oct. 13, 2009, 6 pages.

Non-Final Office Action for U.S. Appl. No. 11/495,613, mailed on Dec. 31, 2009, 39 pages.

* cited by examiner

TECHNIQUES FOR PRINTING WITH INTEGRATED PAPER SHEET IDENTIFICATION

CROSS-REFERENCES TO RELATED APPLICATIONS

This application claims priority from U.S. Provisional Application No. 60/707,739, filed Aug. 12, 2005 and from U.S. Provisional Application No. 60/708,735, filed Aug. 15, 2005, both of which are fully incorporated herein by reference for all purposes.

This application is related to commonly owned, concurrently filed U.S. Application No. <unassigned>, entitled "TECHNIQUES FOR GENERATING AND USING A FINGERPRINT FOR AN ARTICLE" filed concurrently with this application, and is fully incorporated herein by reference for all purposes.

The following is fully incorporated herein by reference for all purposes (referred to herein as "Cowburn") PCT Publication No. WO 2005/088533, entitled "Authenticity Verification Methods, Products, and Apparatuses."

BACKGROUND OF THE INVENTION

The present invention relates generally to printing techniques and in particular to verifiable printing.

Secured paper is commonly associated with currency, stocks, and other financial instruments. The production of conventional secured paper is costly in terms of the paper stock (because specialized paper having security features is required) and the printing equipment (because special inks and printing machinery is required). Many businesses could benefit if secured paper document capability was cost-effectively available.

Various techniques are known for uniquely signaturizing a paper document based on inherent characteristics of the paper. This allows a recipient to verify the originality of a document by obtaining a signature of the paper document in question and comparing it against a data store of signatures of documents.

BRIEF SUMMARY OF THE INVENTION

The present invention provides for secured printed documents. A printer is provided that performs fingerprinting of a sheet for printing to uniquely identify the sheet. The resulting fingerprint is encrypted to produce cyphertext. The encryption is performed using an encryption key provided by a user (the signing authority). The cyphertext is then paired with its corresponding decryption key and the data pair is then encoded using an encoding scheme; for example, barcode encoding can be used to create a barcode representation of the cyphertext and decryption key.

The printed sheet thus contains an encrypted fingerprint of the sheet and a decryption key. A recipient of the printed sheet can verify that the sheet is the original printed sheet and not a photocopy by decoding the printed machine readable information to obtain the encrypted fingerprint data and the decryption key, retrieving the clear text form of the encrypted fingerprint using the decryption key, and comparing that against a fingerprint of the received printed sheet. Furthermore, the recipient is assured that the received printed sheet was in fact produced by the signing authority because the decryption key is certified as belonging to the signing authority.

DETAILED DESCRIPTION OF THE INVENTION

Figure 1A:
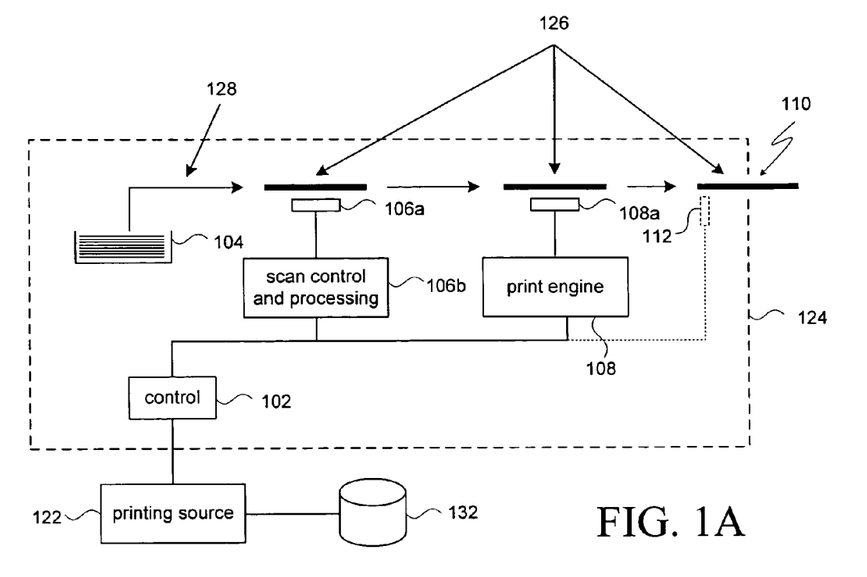
FIG. 1A is a schematic representation of the components of a printer in accordance with an embodiment of the present invention.

An illustrative embodiment of the present invention is shown in the schematic diagram of FIG. 1A. A printing source 122 is in data communication with a printing apparatus 124 and with a database subsystem 132. The printing source 122 is typically a personal computer, but can be any computer-based device that requires and initiates printing services. Data communication between the printing source 122 and the printing apparatus 124 can be over a direct connection between the two components, over communication network, over a wireless connection, and so on.

The printing apparatus 124 includes a control portion 102 for data communication with an external computer, such as printing source 122, and to control the various operations of the printing apparatus. In a specific implementation, the control portion 102 may include a processor with suitable programming code to operate the processor, and suitable supporting logic.

A source 104 provides printable media, such as paper, that are fed along a process path 128 to be subject to processing by other components of the printing apparatus 124. FIG. 1A shows a sheet of printable medium 126 (e.g., paper is common) as it progresses along the process path 128 (indicated by the arrows). Although FIG. 1A depicts source 104 as a paper tray found in conventional printers, it is understood that source 104 can be configured to dispense the printable media in a fashion that is suitable for the nature of the printable media. Also, it is noted that the phrase "a sheet of printable medium" in the context of the present invention is meant to convey the notion of a unit of printed output. For example, in the case of a roll of paper, the entire roll might be construed as comprising a large sheet. However, in the context of the present invention, an individual sheet may be cut from the roll during servicing of a print job.

A sheet of printable medium 126 feeds along the process path 128 to a fingerprinting portion comprising a scan control and processing unit 106b and a scanner 106a to perform a scan of a portion of the sheet to obtain a fingerprint that can uniquely identify the specific sheet of printable medium. Further downstream along the process path 128 is a print engine 108 comprising a print head 108a. The print engine 108 can use laser printing technology, ink-jet printing technology, or any other known printing technology suitable for the printing apparatus 124. The sheet of printable medium 126 proceeds along the process path 128 to a terminus 110 where it exits the printing apparatus 124 as a completed print job.

The control module 102 includes suitable program instructions to receive a print request from the printing source 122 and to interact with the printing source in accordance with the present invention to service the print request. The printing source 122 includes corresponding software commonly referred to as a printer driver (not shown) that serves to interact with the control module 102, as will be discussed in further detail below.

Figure 1B:
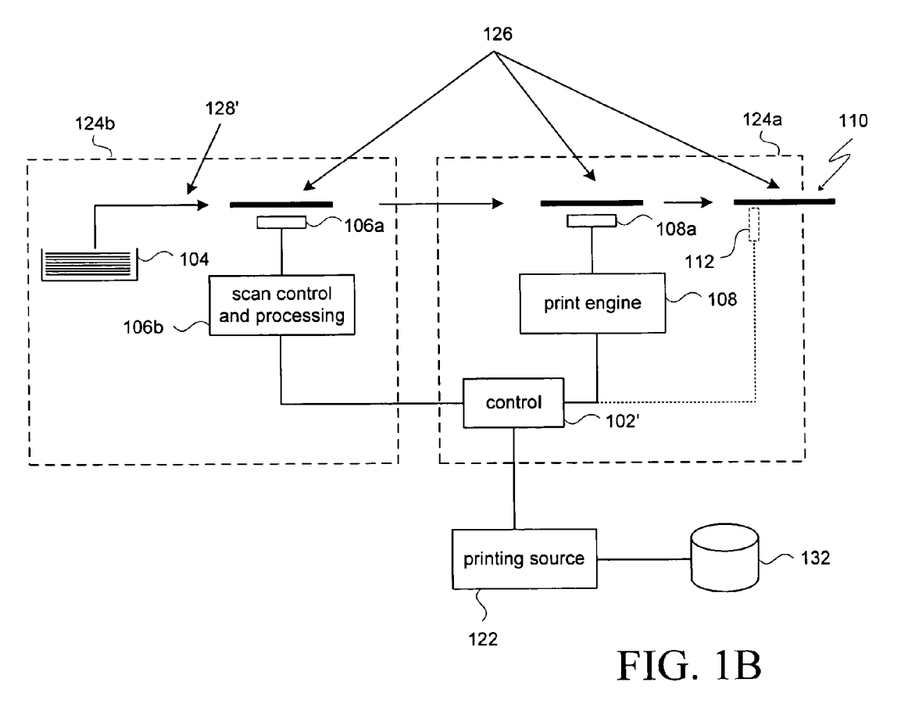
FIG. 1B is a schematic representation of the components of a printer in accordance with another embodiment of the present invention.

An alternative embodiment of the present invention is illustrated in FIG. 1B. Elements common to FIG. 1A and to FIG. 1B are referenced by the same reference numerals. In this particular embodiment, the printing apparatus 124a comprises the printing components 108, 108a. The scan control and processing unit 106b and scanner 106a are contained in a fingerprinting unit 124b. The control module 102 is shown to be in data communication with the fingerprinting unit 124b to control the scan control and processing unit 106b, and for any exchange of data between the fingerprinting unit 124b and the printing apparatus 124a.

The process path 128' begins at the source 104 in the fingerprinting unit 124b, where a sheet of printable medium 126 is retrieved and delivered past the scanner 106a, to obtain a fingerprint of the printable medium. A suitable coupling (not shown) is provided between the fingerprinting unit 124b and the printing apparatus 124a that allows the process path 128' to feed the sheet of printable medium into the printing apparatus. There, the print job is completed and the printed sheet is produced at the terminus 110 of the process path 128'. Of course, it will be appreciated that still other embodiments providing the same combination of functions are possible.

Figure 2:
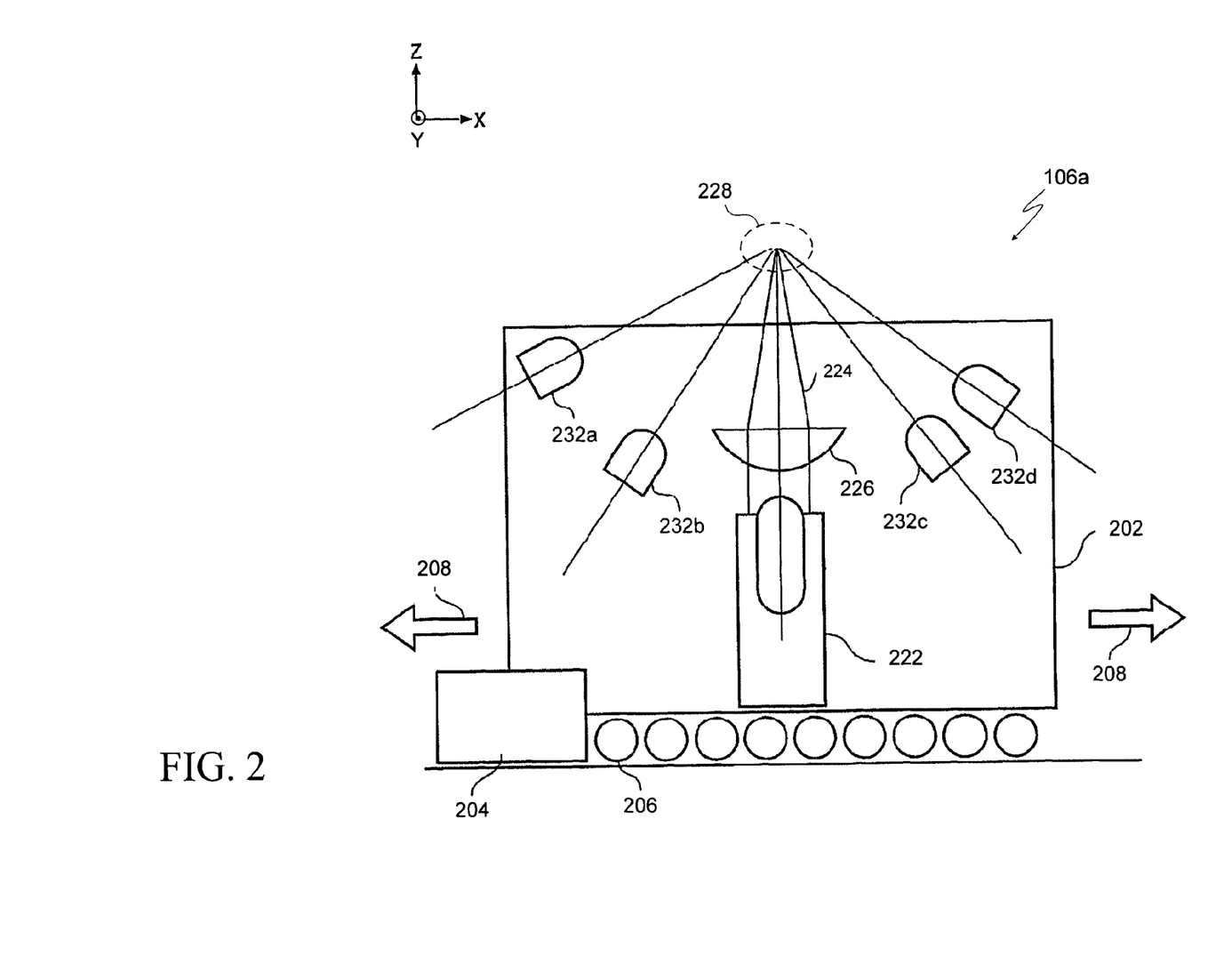
FIG. 2 is a schematic view of an illustrative embodiment of the scanning apparatus 102 shown in FIG. 1.

FIG. 2 is a schematic view of an illustrative embodiment of the scanner 106a of FIG. 1A in accordance with the present invention. The basic operation of the scanner 106a is fully described in Cowburn. Variations of the scanner 106a in accordance with aspects of the present invention not otherwise disclosed or suggested by Cowburn are disclosed below. Additional details of the scanner 106a not otherwise relevant to the present invention are disclosed in Cowburn.

In FIG. 2, the principal optical components of the scanner 106a include a laser source 222 for generating a coherent laser beam 224 and a detector arrangement 232 comprising a plurality of photodetector elements 232a-232d. Although the specific embodiment illustrated in FIG. 2 shows four photodetector elements, it will be appreciated that other numbers of photodetector elements may be employed. The laser beam 224 is focused by a lens 226 to form an elongate focus extending in the y-direction (perpendicular to the plane of the drawing) and passing through in a reading volume 228. The optical components are contained in an optics subassembly 202.

The photodetectors 232a-232d are distributed about the beam at different angles to collect light scattered from a portion of an article present in the reading volume 228, detecting the light scattered by the article when the coherent beam scatters from the reading volume. As illustrated in FIG. 2, the laser source 222 directs the laser beam 224 with its beam axis parallel to the z-axis (i.e., zero degrees relative to the z-axis).

In accordance with an embodiment of the present invention, the laser source 222 can be selectively manipulated to direct the laser beam 224 with its beam axis at a non-zero degree angle relative to the z-axis.

FIGS. 1A and 1B show that the printable medium 126 is carried along the process path 128 past the scanner 106a. In these embodiments, the scanner 106a is stationary. However, in an alternative embodiment, the printable medium 126 can be conveyed to a position along the process path 128 and maintained at that position while the scanner 106a is operated to perform the scan operation. In such an embodiment, the scanner 106a can be provisioned with a drive mechanism. As shown in FIG. 2, an example of such a drive mechanism includes a drive motor 204 to provide linear motion of the optics subassembly 202 via suitable bearings 206. In one embodiment of the present invention, the optics subassembly 202 is translated along the x-axis as indicated by the arrows 208. In another embodiment of the present invention, the drive motor 204 can provide controlled translational motion of the optics assembly 202 in the x-y direction.

Figure 3:
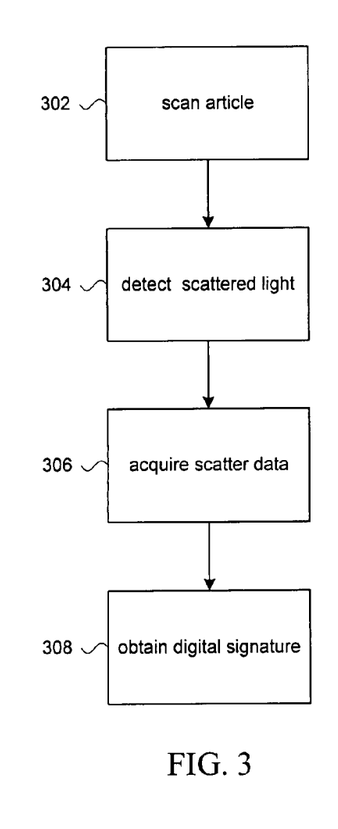
FIG. 3 is a high level description of the process for generating a signature of an article using the scanning apparatus of FIG. 2.

FIG. 3 is a high level overview of the process for generating a signature (also referred to herein as a "fingerprint") of an article using the scanner 106a of FIG. 2. Additional details not otherwise relevant to the discussion of the present invention herein are disclosed in Cowburn.

In a step 302, an article is fed to the scanner 106a. As portions of the article pass through the reading volume 228, the laser beam 224 incident on the surface of the article are scattered due to reflections from the inhomogeneous structures of the intrinsic surface features of the article. The scattered light is detected by the photodetectors 232a-232d (step 304). In a step 306, data is acquired by analog-to-digital conversion of the analog signals output from the photodetectors 232a-232d as they detect the scattered light. This step can be performed by a processor in the scan control and processing unit 106b operated according to suitable programming code. The scattered light produced during the scanning operation results in a unique optical response in the output signals of the photodetectors 232a-232d. As explained more fully in Cowburn, the unique optical response arises from the unique scattering of incident light as it reflects from the irregular microscopic structures of the surface of the article. For example, articles such as paper possess surface features which at the microscopic level are structures of intermeshing of fibers and other such materials which make up paper, generally referred to as intrinsic structure of the article.

In a step 308, the data that is collected from the A/D conversion of the signals from the photodetectors 232a-232d is processed by the scan control and processing unit 106b to produce a signature, the details of which are outside of the scope of the present invention but are disclosed in Cowburn. The data that results from the process uniquely identifies the article, and will be referred to herein as "fingerprint data" or "signature data." Programming code in the scan control and processing unit 106b can operate the processor to perform this step.

Figure 4A:
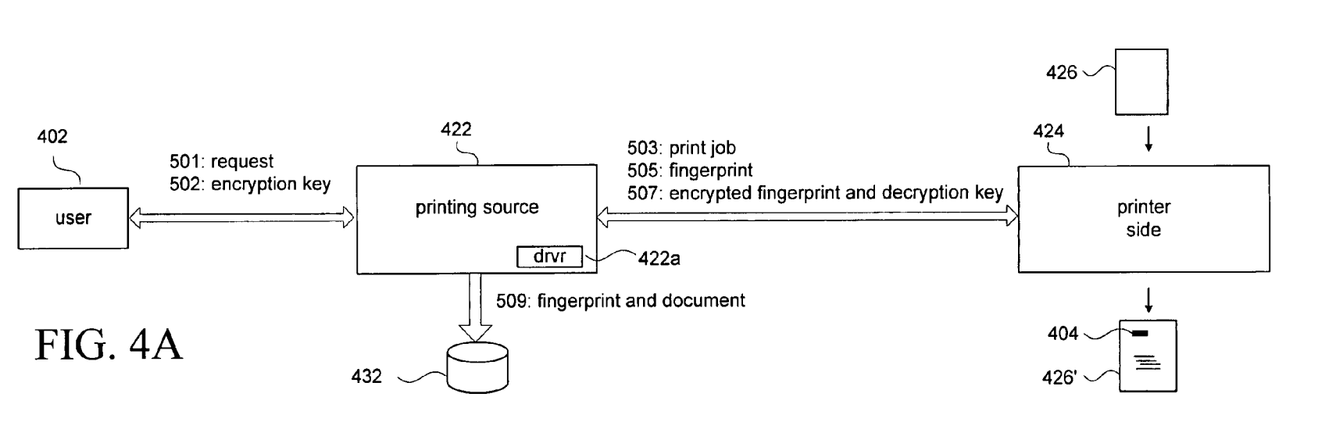
FIGS. 4A-4C are high level representations of the information flow among components which participate in a print request according to various embodiments of the present invention.

In accordance with the present invention, a process for printing provides for digitally signed documents thus guaranteeing the originator of the document, and guarantees the document to be the originally printed document and not a photocopy or otherwise forged copy of the original document. FIGS. 4A and 5A illustrate a process flow for handling a print request in accordance with the present invention. FIG. 4 is a schematic representation of the flow of information among the major components which participate in a print request. FIG. 5 highlights the steps in the process.

A user 402 begins the process by sending a request (step 501) to a printing source 422 (typically a computer; e.g. a PC) to print one or more documents. The user can be a human user, or a machine-type "user" (e.g., an automated print task executing on the same computer, or a different computer).

A suitable printer driver 422a can be installed in the printing source 422 to provide this functionality. A printer driver is program code that operates a data processor to provide a user interface to allow the user to configure the print job and to communicate with the printer to service the print job. It is understood that the printer driver 422a in accordance with the present invention constitutes programming code to operate a processor in the printing source 422 to perform the operations disclosed in the flow charts of FIGS. 5A-5C, including presenting user interfaces and performing communications with the printer side component 424.

In a step 502, the printing source 422 obtains an encryption key that is owned or otherwise associated with the user 402. In the case of a human user, this step can include presenting a query (e.g., by way of a GUI) to the user to enter her encryption key, or some information that would be used to obtain her encryption key. For example, the printing source 422 may have access to a configuration file that contains a list of users and their respective encryption keys.

A user may have more than one encryption key, each representing a different signing authority. For example, the user may sign as an owner of a business, or as a private individual, when printing checks from the same checking program, using the same computer, to the same printer. The signing authority can be an organization, so that the encryption/decryption key(s) is associated with the organization rather than a specific user. Users in that organization would share the same encryption/decryption key(s). In the case of a machine-type user, a table of encryption keys can be provided where the specific encryption key is selected based on the nature of the document being printed, or the machine can be assigned only one encryption key.

Continuing, the printing source 422, responding to the user's request, sends a print job request to the printer side component 424, in a step 503. It is noted that the printer side component 424 can be configured as exemplified in FIGS. 1A, 1B, or by any similar configuration. As will become apparent in the following steps, print processing in accordance with the present invention involves two-way communication between the printing source 422 and the printer side component 424. Many common printing protocols are not suitable for the type of communication needed to practice the present invention. Most printing protocols provide for a job ID, for example, as part of the meta-data that is typically associated with a print request. A special identifier can be used to open a secondary channel between the printing source 422 and the printer side component 424, allowing for interaction in accordance with the present invention.

In a step 504, "fingerprinting" is performed on the printable medium on which the document will be printed to obtain the fingerprint data of the printable medium. FIGS. 2 and 3 above outline the basic mechanics and process for generating the fingerprint data of a printable medium. As discussed briefly above, the fingerprint data is based on the intrinsic structure of the printable medium. Cowburn provides additional detail not otherwise relevant to the present invention.

In one embodiment, the fingerprint data is obtained by scanning a predetermined surface area of the printable medium. Additional methods for obtaining a fingerprint are disclosed in a related, commonly owned, co-pending application, currently identified by and entitled "TECHNIQUES FOR USING A FINGERPRINT FOR AN ARTICLE". For discussion purposes only, the description will assume fingerprinting based on scanning a predetermined surface area. It will be understood that the present invention can be readily adapted to incorporate the fingerprinting methods (such as area selection) disclosed in "TECHNIQUES FOR USING A FINGERPRINT FOR AN ARTICLE". Referring back to FIG. 1A, the control module 102 can include suitable programming code to operate the scan control and processing unit 106b to initiate the process (i.e., fingerprinting) to obtain fingerprint data.

When the fingerprint data has been obtained, the printer side component 424 sends the fingerprint data to the printing source 422 (step 505). In the case of a multi-page document, the number of pages of printable media is determined, and each sheet can be fingerprinted. In this case, the printer side component 424 can send a list of fingerprint data to the printing source 422 (batch mode operation). Alternatively, the printing source 422 and printer side component 424 can process the fingerprint data for the multiple sheets of printable media one sheet at a time.

In a step 506, the printing source 422 performs an encryption of the fingerprint data provided by the printer side component 424 using the user-provided encryption key obtained in step 502 to produce encrypted fingerprint data (a.k.a. cyphertext). In one embodiment, the printer driver 422a can be configured to perform the encryption. Alternatively, the printer driver 422a can offload the encryption task to a separate machine. The encryption algorithm can be a symmetric algorithm, where the encryption and decryption keys are the same key. The encryption algorithm can be asymmetric (e.g., public key cryptography), in which case a pair of cryptographic keys are used; the keys are referred to as a public key and a private key. It will be assumed without loss of generality that public key cryptography is being used.

In a step 507, the resulting encrypted fingerprint data is combined with a decryption key (unencrypted) that is associated with the user-provided encryption key. As will be discussed below, the decryption key will be used to recover the fingerprint data from the encrypted fingerprint data. In the case of public-key/private-key encryption, the user-provided encryption key is referred to as the private key. The decryption key is referred to as the public key. If a public key certificate for a private-public key pair is issued by a trusted certificate authority, the public key can be deemed to be a reliable indication of the user (the signing authority) who produces encrypted data using the corresponding private key. The printer driver 422a transmits the encrypted fingerprint data and the public key to the printer side component 424 along with the data comprising the print job. Alternatively, the encrypted fingerprint data and the public key can be transmitted as metadata.

The phrase "fingerprint information" is being introduced at this point to facilitate further discussions of the present invention. The fingerprint information is the information that is transferred onto the printable medium (e.g., printed on the printable medium), and is used to subsequently obtain the fingerprint data of the printable medium. In this particular embodiment (FIGS. 4A and 5A), the fingerprint information comprises the encrypted fingerprint data and the public key. The fingerprint information will be different for other embodiments of the present invention.

In a step 508, the printer side component 424 performs processing necessary to service the requested print job which includes printing a sheet of printable media 426 to produce a printed document 426'. In accordance with the present invention, the printed document 426' includes machine readable information 404. The fingerprint information is encoded to produce machine readable information 404 suitable for printing on the printable medium. For example, the machine readable information 404 can be a barcode encoding of the fingerprint information. In this case, the barcode (e.g., two-dimensional barcode) directly represents the data comprising the fingerprint information; i.e., the barcode encodes the data comprising the fingerprint information. The fingerprint information is retrieved simply by properly decoding the barcode; e.g., using a barcode scanner. Of course, other encoding techniques can be used to encode the fingerprint information to produce a code that can then be printed on the printable medium.

It is observed that instead of producing machine readable information which is printed on the printable medium, the fingerprint information which is simply binary data can be printed in human readable form; for example in binary notation, or hexadecimal notation. Of course, the data size of the fingerprint data may render this approach impractical. Machine readable information can be more efficient in terms of printed area. Also, using machine readable information to represent the fingerprint operation facilitates automated verification of the printed document, which is the next topic of discussion.

Verification of the printed document 426' can then be performed by a subsequent recipient. First, the machine readable information 404 is decoded to retrieve the fingerprint information. For example, where the machine readable information is a barcode printed on the printed document, a barcode scanner can be used to scan the barcode and decode the barcode to retrieve the fingerprint information (i.e., the encrypted fingerprint data and the public key in this embodiment). Recall from step 507, the public key identifies the signing authority of the received printed document (by way of a trusted certificate authority). The public key is applied to the encrypted fingerprint data to retrieve clear text (a.k.a. plain-text) fingerprint data. A fingerprint operation can then be performed to obtain a fingerprint of the received printed document. If a comparison between the clear text fingerprint data and fingerprint indicates a match, then the recipient can be certain that the received printed document was the original document on which the machine readable information was printed, and that the document was printed by the signing author. It can be appreciated that this process can be automated in a system that employs a barcode reader and a fingerprinting component such as the one shown in FIG. 1A.

However, it is necessary to ensure that the substantive content of the received printed document had not been altered prior to receiving it. For example, an intermediate recipient of the printed document can remove the toner by scraping it, and then rewrite the contents (i.e., a palimpsest) so that the ultimate recipient receives an altered document. If the document were some sort of legal contract, for instance, it might be rewritten to have different terms and yet retain the same fingerprint and machine readable information. Because of how hashes work, it is impossible to perform a verification simply by rescanning and checking the hash value. The reason is that scanning a document twice will almost certainly not produce identical bit maps. Consequently, the hash values that result from hashing each bitmap will likely not match.

Figure 5A:
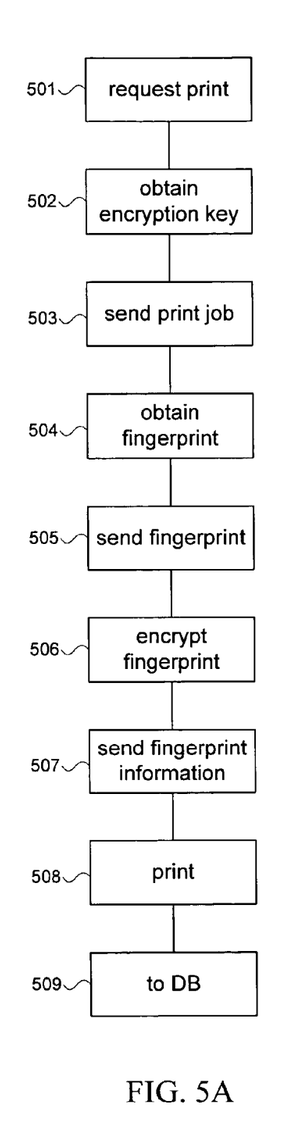
FIG. 5A-5C are high level flow charts of the processing that takes place among the components respectively illustrated in FIGS. 4A-4C.
Figure 6A:
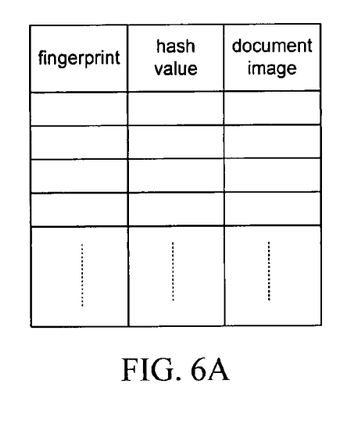
FIGS. 6A and 6B show data structures for storing data in accordance with the present invention.

Returning to FIG. 5A, a step 509 is provided. The printer driver 422a transmits the unencrypted fingerprint data and an image(s) of the printed document ("print image") to a data store 432, at or about the time the print job is sent to the printing side component 424. The data store 432 can be local storage, a remote storage facility, a database (either local, or remote), and so on. FIG. 6A illustrates a data structure for storing the fingerprint data and the print image. The "hash value" field is used in an alternative embodiment of the present invention, discussed below.

By retaining the scanned content, the recipient can make a visual confirmation of the content of the received printed document against the image of the printed document stored in the data store 432. Alternatively, an automated process can perform a match; for example, textual verification can be performed where text obtained by OCR (optical character recognition) of the received printed document is compared to the text of the stored document image. Still other measures of optical differences between the received printed document and the stored document image can be performed. The clear text fingerprint data can be used as a search key to search the data store 432 to find the stored fingerprint data and the corresponding stored image.

In another embodiment of the present invention, the integrity of the stored document image can be verified. In this embodiment, step 507 further includes performing a hash operation on the print image to produce a content verification hash. The fingerprint information thus includes a content verification hash in addition to the encrypted fingerprint data and the public key. This hash can be obtained by encoding the printed bits of the printed page image according to some image encoding scheme, such as JPEG, TIFF, PBM or some similar encoding system. The resulting stream of bits is then processed using a one-way cryptographic hash function, such as MD5, SHA-1, or any of a wide array of such hash algorithms. In step 509, the hash can be stored in the data structure of FIG. 6A along with the fingerprint data and the print image.

During verification, the content verification hash that is retrieved from fingerprint information encoded as indicia printed on the received printed document can compared against the hash value stored in the data structure of FIG. 6A. A positive outcome of the comparison verifies the integrity of the stored document image. Alternatively, a hash value can be computed on the stored document image at the time of the comparison. When the integrity of the stored document image has been verified, the visual comparison between the received printed document and the stored document image can be performed to verify content.

Figure 4B:
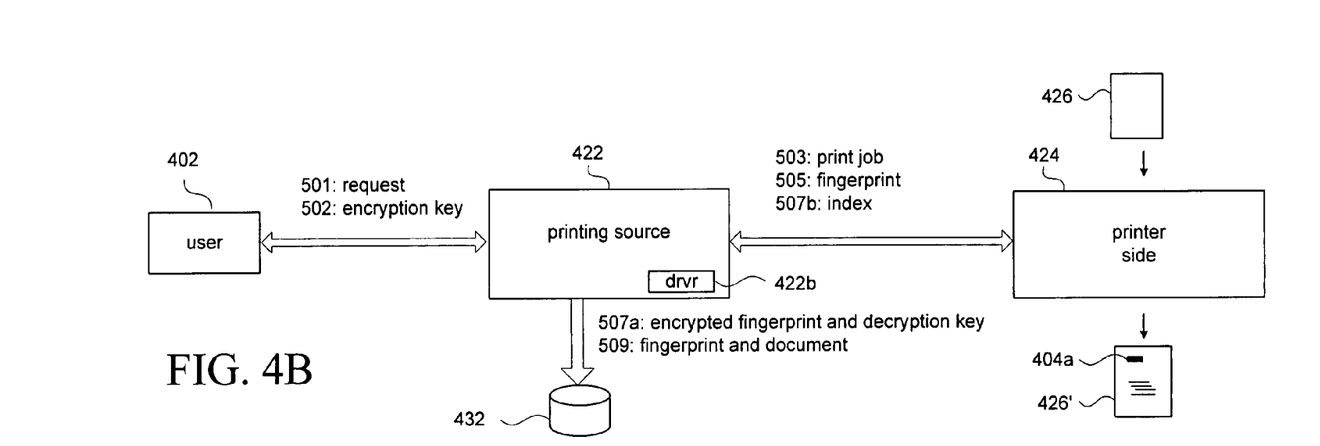
Figure 5B:
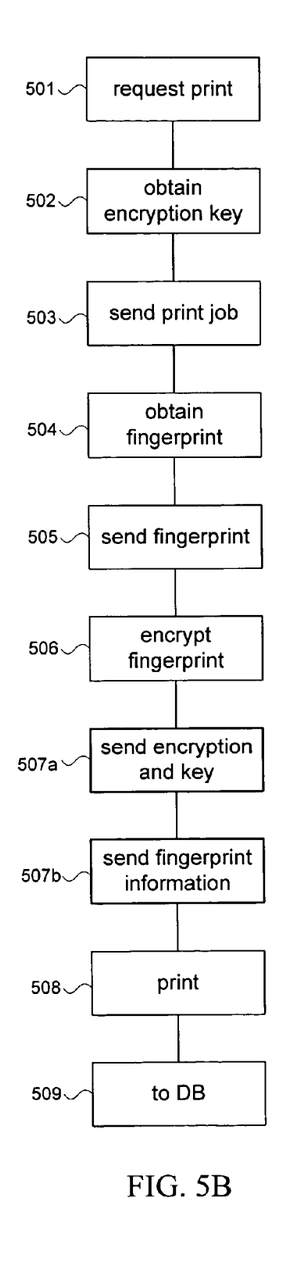
Figure 6B:
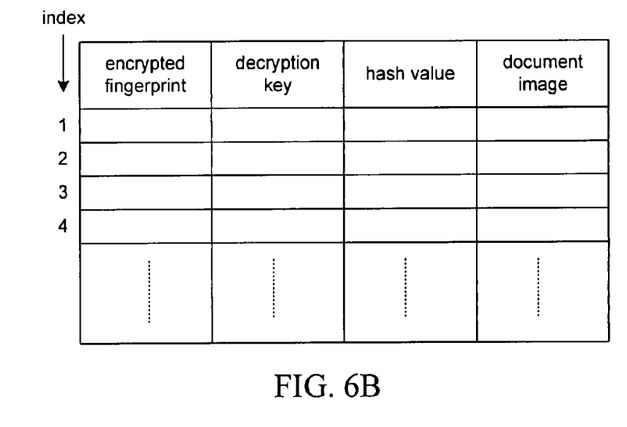

FIGS. 4B and 5B describe a variant of the foregoing described process. Those elements of FIG. 4B and steps of FIG. 5B which are common to FIGS. 4A and 5A are identified by the same reference numeral. In the embodiment shown in FIGS. 4A and 5A, the machine readable information 404 directly encodes the fingerprint information (i.e., the encrypted fingerprint data and the public key). Alternatively, FIGS. 4B and 5B show an embodiment in which the machine readable information 404a encodes an identifier that is used to access the encrypted fingerprint data and the public key rather than the encrypted fingerprint data and the public key which is stored elsewhere in a data structure. For example, FIG. 6B shows an example of such a data structure organized into rows. Each row contains a triad comprising encrypted fingerprint data, a decryption key, and an image of a document. An index identifies each row in the data structure. A hash value field (not shown in FIG. 6B) can be provided for additional integrity checking as discussed above.

Thus, in FIGS. 4B and 5B a suitably configured printer driver 422a stores (step 507a) the data triad comprising the encrypted fingerprint data, the public key, and a print-image of the document in a suitable data structure. The printer driver 422b obtains a search key that can subsequently be used to access the data triad from the data structure. In a step 507b, the printer driver 422b sends the search key to the printer side component 424. For example, in the case of the data structure of FIG. 6, the search key would be an index identifying the row in the data structure where the encrypted fingerprint data, the public key, and the document image are stored. Then in step 508, the search key can be encoded in as suitable machine readable information 404' that is then printed on the printable medium. In this particular embodiment, the fingerprint information comprises the search key.

The verification procedure on a printed document 426' produced according to the embodiment shown in FIGS. 4B and 5B includes reading the machine readable information 404a and obtaining the search key (fingerprint information). The search key is then used to retrieve the data triad from the data structure (e.g., by indexing into the data structure of FIG. 6). At this point, the encrypted fingerprint data and the public key are obtained, and so the verification proceeds in the manner described above.

Figure 7:
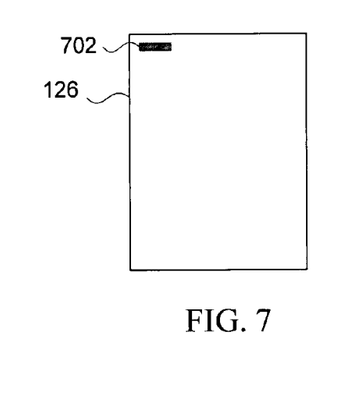
FIG. 7 illustrates a sheet of printable medium having embedded therein an RFID tag.

Turning to FIGS. 1A and 7, in another embodiment of the present invention, the printing apparatus 124 includes an RFID (radio frequency ID) writer 112. The RFID writer 112 is indicated in dashed lines. Similarly, an RFID writer 112 can be incorporated in the printing apparatus 124a of FIG. 1B as an alternative embodiment. The RFID writer 112 can communicate the fingerprint information to an RFID tag 702 embedded in the printable medium 126. Therefore, in this particular embodiment, the machine readable information comprises the electronic data of the fingerprint information that is stored in the RFID tag 702, rather than a printed glyph used to obtain the fingerprint information (e.g., 404 in FIGS. 4A, 5A). The control module 102 in the printer side component 424, upon receiving the fingerprint information from the printing source 422, can operate the RFID writer 112 to transfer the fingerprint information to the embedded RFID tag 702 at the appropriate time as the printable medium 126 passes the RFID writer 112. Techniques for embedding RFID tags in printable media such as paper are known. RFID writing devices for communicating data to an RFID tag are known.

An RFID reader can then be utilized to read out the fingerprint information from the RFID tag. Verification processing can then proceed as described above. RFID readers are known.

Thus, in accordance with the present invention, the fingerprint information can be transferred to the printable medium either by printing machine readable information in the form of a barcode or some other glyph that encodes the fingerprint information, or by storing the fingerprint information in an embedded RFID tag.

Figure 8:
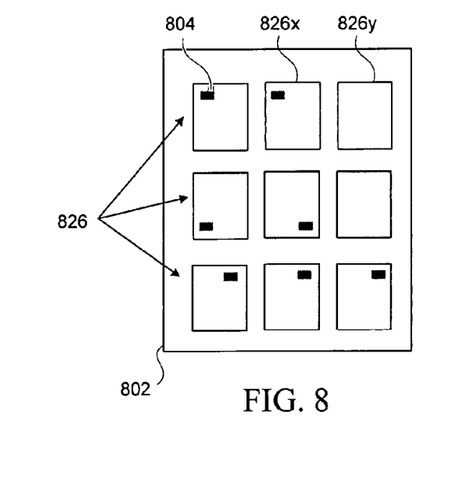
FIG. 8 illustrates printing multiple images on a sheet of printable medium in accordance with the present invention.

FIG. 8 illustrates that a sheet of printable medium 802 can be printed with multiple images 826 (e.g., coupons, or even currency). Each image 826x carries the fingerprint information 804, either in the form of machine readable information being printed in each of the images, or in the form of electronic information stored in an embedded RFID tag. This printing technique can be especially useful for large scale printing, where each sheet can have N (N>1) copies of the image.

Referring to the scanner 106a shown in FIG. 2, a drive motor 204 configured for x-y translation can be used to move the scanner over areas of the printable medium 802 within each of the images 826 to be printed. Each area within an image 826x can thus be scanned to obtain a fingerprint for that image. The printed sheet of printable medium can then be further processed by a cutting tool to cutout each image.

FIG. 8 illustrates the idea that it is not necessary that each image carry the fingerprinting information 804. The figure shows that some images 826y do not have fingerprint information. The figure further illustrates that the location of the fingerprint information in each image 826x can be varied among the images.

The embodiment illustrated in FIG. 8 requires additional processing by the printing source 422. The printer driver 422a can be further configured to obtain additional configuration information such as the number of individual images to be printed on a sheet, location of the fingerprint information, and so on. The configuration information can be interactively obtained from a user 402 via a GUI, from a configuration file, through interaction with an application used to generate the images 826, and so on. The printer driver 422a can be further configured to convey the configuration information to the printer-side component 424. The printer-side component 424 can then perform fingerprinting in an area of each image 826x to be printed to produce fingerprint data for each image. Recall that the fingerprint data is based on the intrinsic structure of the sheet (e.g., sheet of paper). The intrinsic structure varies depending on the area of the sheet, so each fingerprinted area will be unique to the image corresponding to that fingerprinted area.

The printer driver 422a can be further configured to communicate with the printer-side component 424 to process the plurality of fingerprint data that results from fingerprinting the plural images 826. For example, with respect to FIG. 5A, the steps 504-507 can be repeated for each fingerprinted area among the images 826. Alternatively, the process can be performed in batch mode where fingerprint data for each of the images 826 are collected (step 504) and then the plurality of fingerprint data are sent to the printing source 422 to be encrypted (steps 505, 506). The plurality of encrypted fingerprint data can then be sent to the printing-side component 424 per step 507.

FIG. 8 can be used to further illustrate another embodiment of the present invention, wherein a sheet 802 comprises a plurality of labels 826, such as adhesive backed labels which can be peeled off and affixed to items. Each label can be printed in accordance with the foregoing described embodiments. For each label, the label can be fingerprinted, the label's fingerprint and usage-specific information can be encrypted to produce cyphertext, and the cyphertext can then be encoded to produce machine readable information which is then printed onto the label. Such labels can be guaranteed to have been affixed by a certain authority, and to be unchanged from when the label was affixed to the item.

Figures 4C, 9:
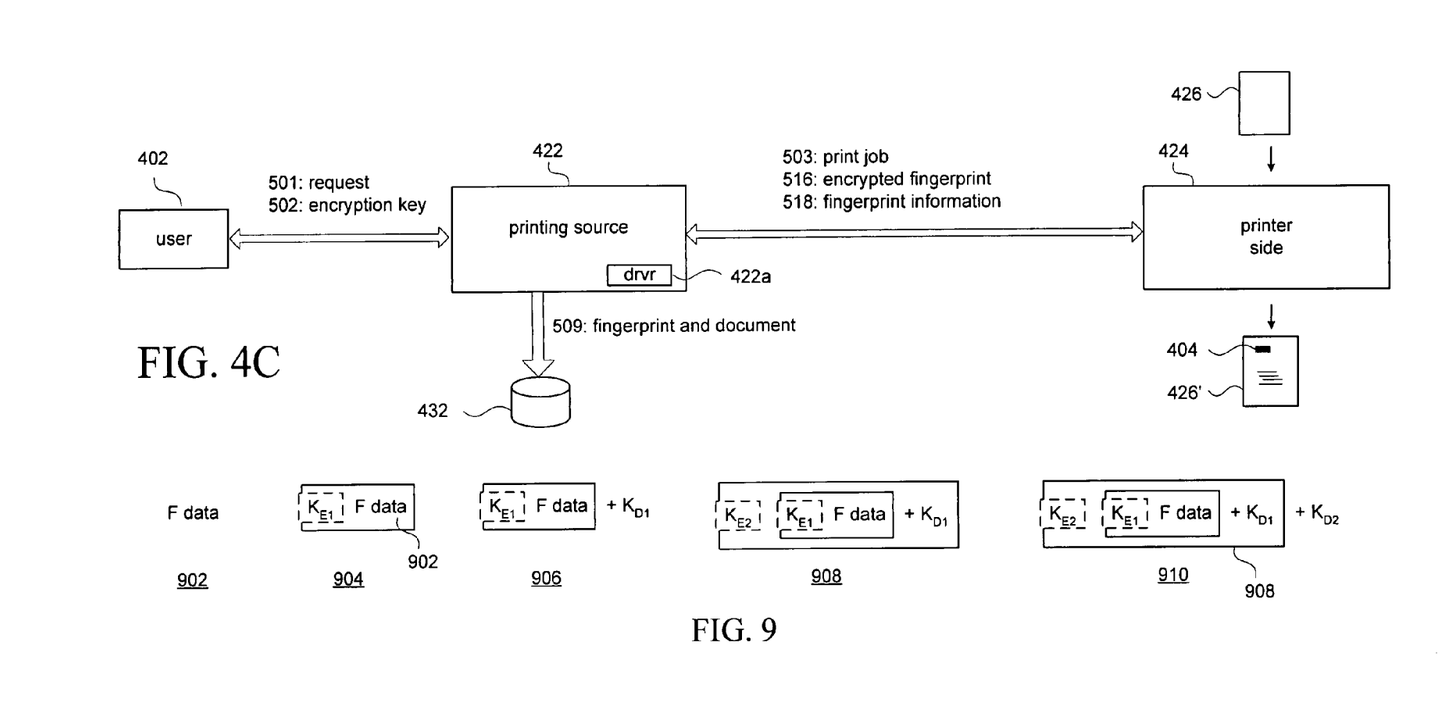
FIGS. 9 and 9A illustrate encryption sequences in accordance with embodiments of the present invention.
Figure 5C:
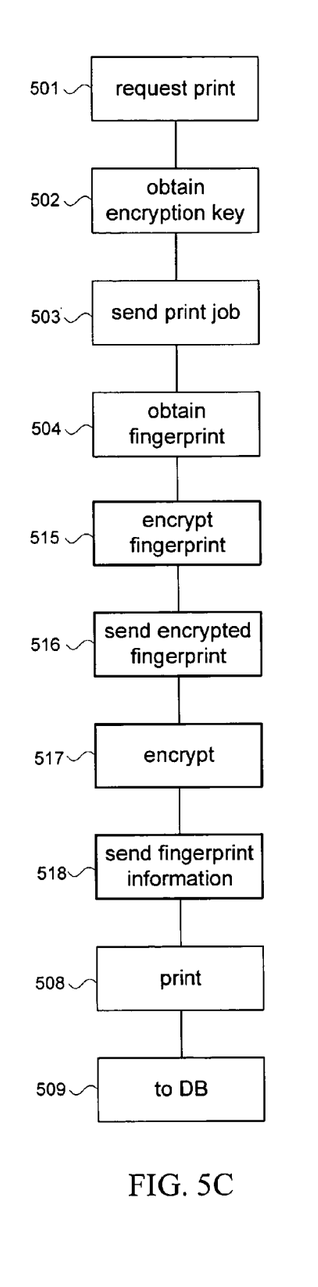

In another embodiment of the present invention, the printing side component 424 can digitally sign the printed document, in addition to the user's digital signature. FIGS. 4C and 5C illustrate this particular embodiment. Steps in FIG. 5C that are common among FIGS. 5A-5C are represented by the same reference numerals and are discussed above.

Refer now to FIGS. 4C, 5C, and 9. Subsequent to the printer-side component 424 obtaining the fingerprint data in step 504, the fingerprint data is encrypted using a private key associated with the printer-side component (step 515). FIG. 9 illustrates clear text fingerprint data 902, and encrypted fingerprint data 904 obtained using the printer-side private key ($K_{E1}$).

In a step 516, the encrypted fingerprint data is combined with the unencrypted public key $K_{D1}$ that corresponds to the above private key and the resulting data pair 906 is sent to the printing source 422. Note that the content verification hash discussed above can be included. (see the content verification hash H contained in 906' in the alternative sequence of FIG. 9A).

In a step 517, the data pair 906 is encrypted by the printer driver 422a using the user-provided encryption key (private key) obtained in step 502. FIG. 9 illustrates the encrypted data pair 908 obtained using the user-provided private key ($K_{E2}$). The resulting encrypted data pair 908 is paired up with the public key ($K_{D2}$) that is associated with the user's private key and sent to the printer-side component 424 as data pair 910, which constitutes the fingerprint information for this particular embodiment. Processing in the printer-side component 424 proceeds as discussed above in connection with steps 508 and 509 to produce the printed document 426', including transferring the fingerprint information to the printed sheet 426' in the form of printed machine readable information 404.

Verification of a printed document 426' obtained in accordance with this embodiment of the present invention includes decoding the machine readable information 404. The result of the decoding operation is the data pair 910. The public key $K_{D2}$ is then applied to the encrypted data pair 908 to obtain the data pair 906. The public key $K_{D1}$ is then applied to the encrypted fingerprint data 904 to obtain the fingerprint data 902. At this point, the fingerprint data 902 has been retrieved and the verification process can proceed as described above.

Figure 9A:
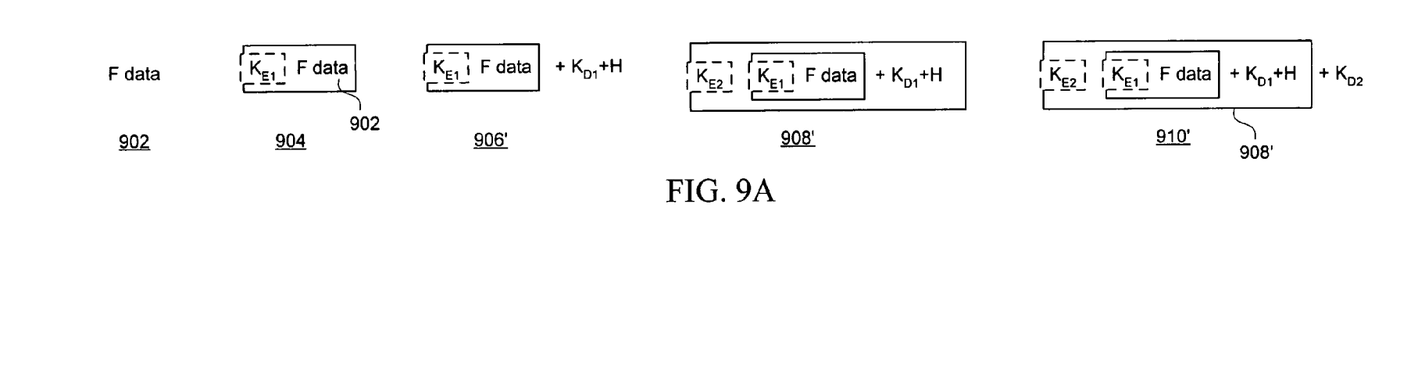

In an alternative embodiment that utilizes the above-described content verification hash, the sequence in FIG. 9A applies. Verification of a printed document 426' obtained in accordance with this alternative embodiment includes decoding the machine readable information 404. The result of the decoding operation is the data pair 910'. The public key $K_{D2}$ is applied to the encrypted data triad 908' to obtain the data triad 906' (comprising encrypted fingerprint data, public key, and hash value). The public key $K_{D1}$ is then applied to the encrypted fingerprint data 904 to obtain the fingerprint data 902. At this point, the fingerprint data 902 and content verification hash H have been retrieved and the verification process can proceed as described above.

The foregoing description of the encryption sequence illustrated in FIG. 9 explained that the printer-side component 424 performed the first encryption and then the printing source 422 performed the second encryption. FIG. 9 can be used to explain an alternative encryption sequence, where the printing source 422 performs the first encryption and then the printer-side component 424 performs the second encryption. In this particular embodiment, the printer-side component 424 sends the fingerprint data 902 to the printing source 422 (as in the embodiment shown in FIGS. 4a and 5A), where the latter applies the user-provided encryption key $K_{E1}$ to the fingerprint data to produce encrypted fingerprint data 904. The data pair 906 is sent to the printer-side component 424, where it is then encrypted using the printer-side private key ($K_{E2}$) to obtain the encrypted data pair 908. The encrypted data pair 908 is in turn paired with the printer-side public key ($K_{D2}$) to form the data pair 910. Finally, the data pair 910 is then encoded and transferred to the printed document 426' as printed machine readable information 404.

What is claimed is:

1. A method for printing an electronic document comprising:
   a first computer system receiving from a second computer system, separate from the first computer system, a communication to print a document;
   transmitting to the second computer system fingerprint data for at least a first sheet of printable media on which the document is to be printed, the fingerprint data based on data obtained from intrinsic structure of the first sheet of printable media;
   receiving from the second computer system encrypted fingerprint data and a first decryption key, the encrypted fingerprint data comprising an encrypted form of the fingerprint data produced by the second computer system, the first decryption key suitable for decrypting the encrypted fingerprint data to thereby recover the fingerprint data; and
   printing the document on the first sheet of printable media, including transferring machine readable information to the first sheet of printable media, wherein the encrypted fingerprint data and the first decryption key can be obtained from the machine readable information.

2. The method of claim 1 wherein the step of transmitting fingerprint data includes scanning a first area of the first sheet of printable media with a beam of light to obtain optical data based on measurements of light scattered from intrinsic structure of the surface of the first area and processing the optical data to produce the fingerprint data.

3. The method of claim 1 wherein the machine readable information comprises an encoding of both the encrypted fingerprint data and the first decryption key.

4. The method of claim 1 further comprising receiving from the second computer system a hash value computed from a hash operation performed on the document to be printed, wherein the machine readable information comprises an encoding of the encrypted fingerprint data, the first decryption key, and the hash value.

5. The method of claim 1 wherein the fingerprint data is transmitted to the second computer system in unencrypted form.

6. The method of claim 1 wherein the step of transmitting fingerprint data includes encrypting the obtained data to produce encrypted data, the fingerprint data comprising the encrypted data and a second decryption key suitable for decrypting the encrypted data to recover the obtained data.

7. The method of claim 6 wherein encrypting the obtained data includes encrypting the obtained data with a second encryption key.

8. The method of claim 1 wherein the transferring includes encrypting the encrypted fingerprint data whereby the machine readable information comprises an encryption of the encrypted fingerprint data and a second decryption key suitable for decrypting the encryption of the encrypted fingerprint data to thereby recover the encrypted fingerprint data.

9. The method of claim 1 wherein the transferring includes either printing the machine readable information on the first sheet of printable media, or storing the machine readable information in an electronic memory of a tag embedded in the first sheet of printable media.

10. The method of claim 1 wherein the fingerprint data is obtained from a first area of the first sheet of printable media, the method further comprising generating additional fingerprint data for additional areas of the printable media, wherein the steps of transmitting and receiving are performed for the additional fingerprint data, wherein additional machine readable information is transferred to the first sheet of printable media.

11. A printing device comprising:
   a control component configured to control operations in the printing device and to communicate with a computer system that is separate from the printing device and is a source for print requests;
   a source of printable media;
   a fingerprinter operable to obtain fingerprint data from a sheet of printable media, the fingerprint data being determined based on an intrinsic structure of the sheet of printable media; and
   a printer component operable to produce printed matter on a sheet of printable material, the source of printable media configured to provide a first sheet of printable media in response to receiving a request from the computer system to print an electronic document, the control component further configured to:
  cause the fingerprinter to obtain data from a portion of the first sheet of printable media;
  transmit the fingerprint data to the computer system;
  receive fingerprint information from the computer system comprising encrypted fingerprint data produced by the computer system and a first decryption key suitable for decrypting the encrypted fingerprint data to thereby recover the fingerprint data;
  cause the printer component to produce printed matter on the first sheet of printable media; and
  transfer machine readable information to the first sheet of printable media, wherein the fingerprint information can be obtained from the machine readable information.

12. The device of claim 11 wherein the fingerprint data is based on optical data obtained from measurements of light scattered from intrinsic structure of the surface of a first area of the first sheet of printable media.

13. The device of claim 11 wherein the machine readable information comprises indicia printed on the first sheet of printable media.

14. The device of claim 11 wherein the machine readable information comprises an encoding of the fingerprint information.

15. The device of claim 14 wherein the fingerprint information further comprises a hash value computed from a hash operation performed on the electronic document to be printed.

16. The device of claim 11 further comprising a writer device configured to transmit data to a data store of an electronic tag embedded in a sheet of printable media, wherein the machine readable information comprises data transmitted by the writer device to the data store of an electronic tag embedded in the first sheet of printable media.

17. The device of claim 11 the source of printable media provides the first sheet of printable media by dispensing a single sheet of printable media.

18. The device of claim 11 wherein the control component is further configured to encrypt the obtained data to produce encrypted data wherein the fingerprint data comprises the encrypted data.

19. The device of claim 11 wherein the control component is further configured to encrypt the fingerprint information.

20. A method for printing an electronic document at a first computer system comprising:
  receiving from a second computer system, separate from the first computer system, a request to print a document;
  transmitting to the second computer system fingerprint data for a first sheet of printable media on which the document is to be printed, the fingerprint data determined from an intrinsic property of the first sheet of printable media, wherein the second computer system encrypts the fingerprint data and stores the encrypted fingerprint data and a first decryption key in a data store, the first decryption key suitable for recovering the fingerprint data from the encrypted fingerprint data;
  receiving from the second computer system a location indication which can be used to obtain from the data store the encrypted fingerprint data and the first decryption key stored therein; and
  printing the document on the first sheet of printable media, including transferring machine readable information to the first sheet of printable media, wherein the location indication can be obtained from the machine readable information.

* * * * *